Jan. 15, 1957 G. H. VINEYARD 2,777,967
HIGH FREQUENCY OSCILLATOR
Filed April 18, 1946 2 Sheets-Sheet 1

INVENTOR
GEORGE H. VINEYARD
BY
ATTORNEY

Jan. 15, 1957  G. H. VINEYARD  2,777,967
HIGH FREQUENCY OSCILLATOR
Filed April 18, 1946  2 Sheets-Sheet 2

INVENTOR
GEORGE H. VINEYARD

BY *M. Q. Hayes*

ATTORNEY

United States Patent Office 2,777,967
Patented Jan. 15, 1957

2,777,967

HIGH FREQUENCY OSCILLATOR

George H. Vineyard, Columbia, Mo., assignor, by mesne assignments, to the United States of America as represented by the Secretary of the Navy Application April 18, 1946, Serial No. 662,982

10 Claims. (Cl. 315—5)

This invention relates to electronic apparatus and the methods for manufacturing such apparatus, and is particularly concerned with methods of manufacturing ultra high frequency cavity resonators and assemblies.

Ultra high frequency devices of the velocity modulation type employing cavity resonators are being widely used for frequencies required of local oscillators of radar and communication systems. These resonators have dimensions corresponding to the resonant wave length of the electromagnetic field oscillating therewithin. The present tendency is toward devices resonating at shorter wave lengths thus requiring the production of hollow resonators of very small physical dimensions. This has raised many difficult problems of manufacture and assembly of both the resonator and the apparatus with which it is used, since the exacting requirements for accurately measured construction essential in all such apparatus must be met in these very small resonators wherein even slight change of shape and size produce widely varying results. Many of the present types demand metal disc-to-glass seals which are difficult to make and are a source of structural weakness and frequent failure. The presence of glass in the outer resonant cavity of other types results in considerable power loss and erratic operating conditions. There are reflex klystrons in use that do not involve the use of metal disc-to-glass seals, but these require the output coupling loop to enter directly into the inner resonant cavity. At very short wave lengths, the small size of this cavity makes such devices extremely difficult to fabricate, and virtually impossible to hold to reproducible dimensions.

With the above in mind, it is a major object of the present invention to provide ultra high frequency apparatus which is constructed largely of metal and can be made and assembled with comparative ease.

A further object of the invention is to provide an accurately dimensioned very small cavity resonator for enabling controlled tuning.

Another object of the invention is to provide novel wave guide arrangements for extracting energy from a cavity resonator.

The foregoing and other objects of the invention will become apparent from the detailed description when taken with the accompanying drawings in which.

Figure 1:
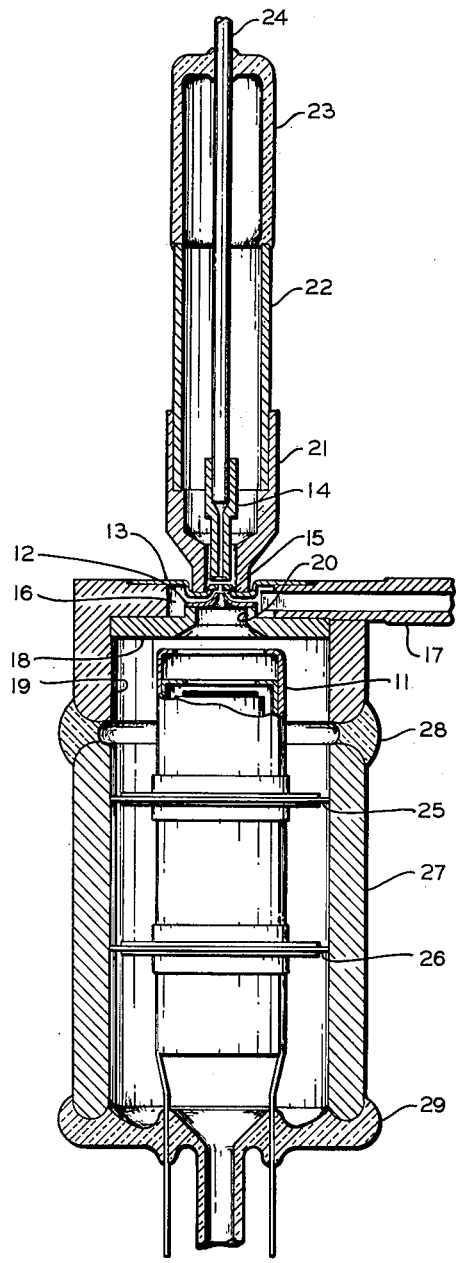
Fig. 1 is a greatly enlarged section through the axis of an ultra high frequency oscillator embodying this invention.

A discussion of the invention as shown in Fig. 1 will illustrate its operation and point out factors which contribute to ease of fabrication. A conventional electron gun 11 provides a focussed beam of electrons which is shot through the apertures in the cavity discs 12 and 13 and is turned and sent back again to the vicinity of the cathode of the gun by a negative potential applied to reflector electrode 14. Surrounding the two apertures which the electron beam traverses is a cavity 15 having a fundamental mode resonant near the frequency at which it is desired to operate the tube. By the well-known principles of the reflex klystron this cavity 15 will extract energy from the electron beam at its resonant frequency, and thus be set in oscillation. A small annular gap leads radially outward from the resonant cavity 15 and allows high frequency power to flow from the cavity. Surrounding this gap is another larger cavity 16, and from this cavity a wave guide 17 conducts the power away to the point at which it is to be used. The purpose of outer cavity 16 is to provide the proper transformation of impedance between wave guide 17 and inner cavity 15.

Figure 2:
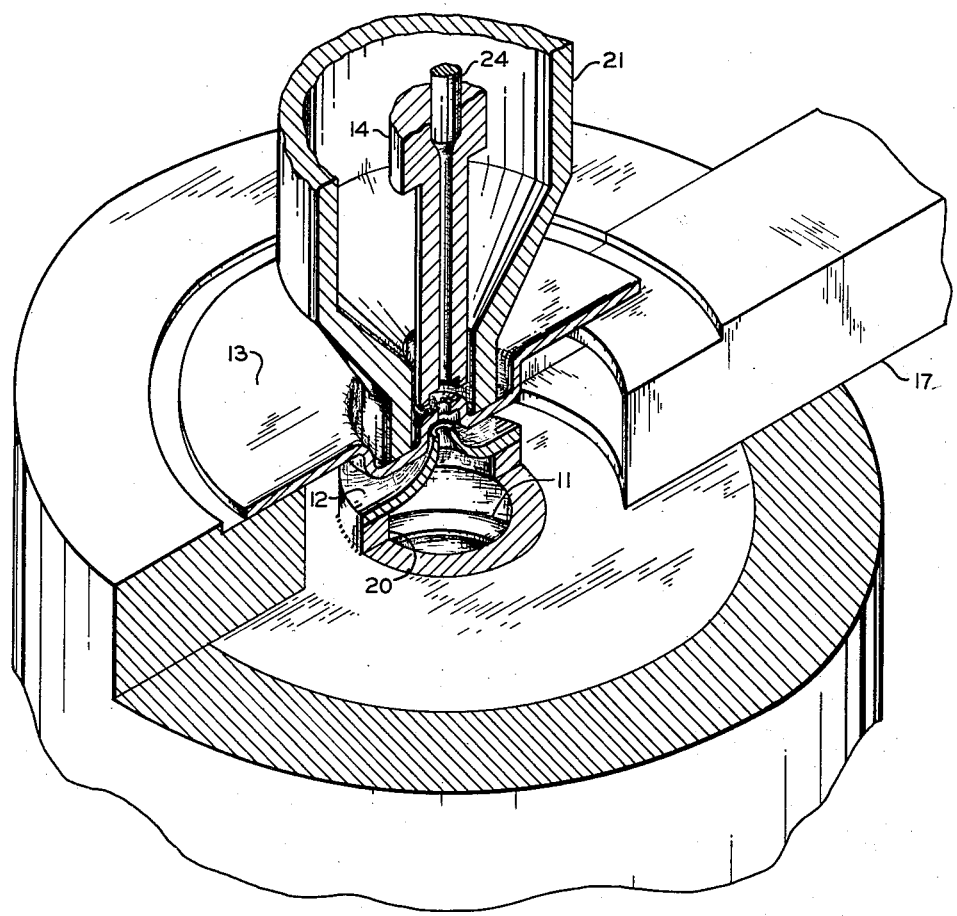
Fig. 2 is a greatly enlarged representation, partly in perspective and partly in section, illustrating how a wave guide extracts energy from the side wall of a large cavity coupled to the smaller resonant cavity.

As previously mentioned, the tube is designed to be manufactured with comparative ease. The inner cavity 15 is formed by two discs 12 and 13 drawn from thin sheet metal, such as copper. The outer cavity 16 is machined from some metal which can be sealed to glass, such as Kovar, and closed at its top by disc 13 which is soldered to it at its outer edge, and at its bottom by disc 12, which is secured to bottom disc support 18 by solder. The output wave guide 17 enters through a slot in the side of the outer cavity and is sealed in place by solder. The location of the output wave guide in reference to the body of the tube is clearly shown in Fig. 2, which is a greatly enlarged illustration of the cavities and the output wave guide. The frequency determining resonator is formed by discs 12 and 13 as described above. Wave guide 17 is secured in a slot milled from the Kovar cylinder which forms the main body of the tube. The end of the wave guide is formed to fit the inner wall of the outer cavity at the point of insertion. A coupling choke is mounted on the outer end of the wave guide, and will be subsequently described in connection with Fig. 3. Referring again to Fig. 1, the inner and outer cavities are assembled upon a cylindrical jig, which bears upon the inside of the lower skirt of the outer cavity at point 19 and upon the bottom disc support 18 at point 20. The jig also supports a pin which projects up through the holes in the discs and the axial alignment of the discs is insured by their bearing upon this pin.

Soldered to upper disc 13 is a metal pipe 21 which is attached to an outer tube 22 made of Kovar, or some other metal capable of being sealed to glass. A glass tube 23 is sealed on metal tube 22, giving insulating support to metal rod 24, at the lower end of which is reflector electrode 14. The spacing and centering of reflector 14 is accomplished by passing a jigging pin, similar to that described above, up through the holes in discs 12 and 13, and setting the reflector upon this pin by means of the small hole in reflector 14. The height of the pin is adjusted by means of suitable external gauges to insure the proper spacing between top disc 13 and reflector 14. The seal at the top of the tube between reflector lead 24 and glass tube 23 is then made and reflector 14 is held permanently in position.

The electron gun 11, is supported upon two mica washers 25 and 26 which bear upon a sleeve 27. This sleeve is attached to the lower skirt of the outer cavity by glass seal 28. The gun tube 27 may be made either of machined, glass sealing metal, as indicated, or of glass. If made of glass, the interior of sleeve 27 may be made to give firm, accurate support to the mica washers by means of dimples, or indentations made while the tube is being heated on an accurate cylindrical mandrel. The bearing surfaces of gun tube 27 are made accurately coaxial with the rest of the device by holding the gun tube on an interior cylindrical jig which is supported on the accurately machined interior surfaces of the lower skirt of the outer cavity, at the time tube 27 is sealed in place. Consequently, the electron gun is accurately lined up with the axis of the holes and the reflector. At the bottom of tube 27 is sealed a glass press 29, which closes off the bottom of the tube and supports the electrical leads to electron gun 11, and a tubulation for exhausting the entire tube.

Figure 3:
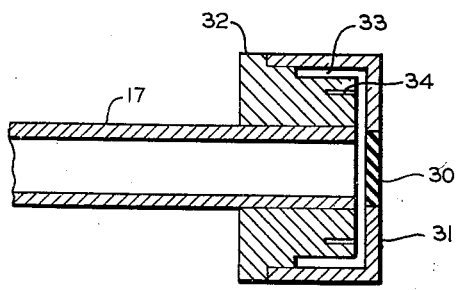
Fig. 3 is an axial section through the termination of the wave guide which is coupled to the outer cavity of the oscillator.

The outer end of the output wave guide is closed as shown in Fig. 3. Over the end of the wave guide 17 is placed a glass window 30 sealed in a metal cup 31 which, in turn, is soldered to a cylindrical metal boss 32 which is soldered on the end of the wave guide. Grooves 33 and 34 cut in metal boss 32 provide a choke arrangement which prevents the reflection of power by the discontinunity between cup 31 and metal boss 32. The window is so designed in thickness and area, that another wave guide may be placed in external continuation of the output wave guide, and power will flow into it without appreciable reflections.

Referring again to Fig. 1, the tube may be tuned in frequency by moving the reflector pipe 21 up and down by suitable means, bending the top disc 13 near where it is soldered to the outer cavity, thus changing the spacing between top and bottom discs at the center of cavity 15.

In the foregoing discussion a wave guide coupling arrangement by which energy is extracted from the outer cavity was described. It is apparent that a coupling loop could be inserted into the outer cavity and sealed at the walls of the cavity with equally good results.

Suggested applications of this invention include use as a local oscillator in radar on communication systems operating at such a frequency, or a bench oscillator for use in the design of power transmission components at this frequency.

As many changes could be made in the construction described above, and many apparently widely different embodiments of this invention could be made without departing from the scope thereof, it is intended that the above specification be interpreted as illustrative and not in a limiting sense.

What is claimed is:

1. An oscillator comprising, a first cavity resonator, means adjacent said first cavity resonator for directing a beam of electrons axially through said first resonator, an annular cavity resonator of larger dimension than said first resonator and disposed concentrically therewith, means defining an annular coupling gap extending radially outward from said first cavity resonator into said annular cavity resonator for coupling energy thereto from said first resonator, and means coupled to said annular cavity resonator for extracting energy from said annular cavity resonator at the resonant frequency of said first cavity resonator.

2. An oscillator comprising, a first cavity resonator having a cylindrical contained volume, means adjacent said first cavity resonator for directing a beam of electrons axially through said first resonator, a second cavity resonator having an annular volume disposed concentrically with said first resonator, conducting structure defining an annular coupling gap communicating with said first resonator at the periphery thereof and extending radially outward into said second cavity resonator, said coupling gap being dimensioned to provide an impedance transformer between said first and second cavity resonators, and means coupled to said second cavity resonator for extracting energy from said second cavity resonator at the resonant frequency of said first cavity resonator.

3. Apparatus in accordance with claim 2 wherein said last-mentioned means comprises a wave guide coupled to said second cavity resonator.

4. An oscillator comprising, a first cavity resonator having containing walls of thin flexible material arranged whereby one of said walls may be readily flexed for tuning said first resonator, means adjacent said first cavity resonator for directing a beam of electrons axially through said first resonator, a second cavity resonator of annular shape disposed concentrically with said first resonator, conducting structure defining an annular coupling gap communicating with said first resonator and extending radially outward into said second resonator for coupling energy from said first resonator to said second resonator, said annular gap being dimensioned to provide an impedance transformer between said first and second cavity resonators, and a wave guide coupled to said second resonator for extracting energy therefrom at the resonant frequency of said first cavity resonator.

5. An oscillator comprising, two discs of electrically conductive material having aligned apertures therein at their centers and formed to define a first cavity resonator, means adjacent said first cavity resonator for directing a beam of electrons axially through said first resonator, a reflector mounted transversely of the path of said electron beam for returning electrons into said first resonator, a second cavity resonator of annular shape concentrically surrounding said first resonator, said discs further being formed to define an annular coupling gap communicating with said first resonator and extending radially outward into said second resonator, said annular gap being dimensioned to provide an impedance transformation between said first and second resonators, and a wave guide coupled to said second resonator for extracting energy therefrom at the resonant frequency of said first resonator.

6. Ultra high frequency apparatus comprising, a pair of spaced, generally circular, conducting discs having aligned apertures therein at the centers thereof, means adjacent said conducting discs for directing a beam of electrons through said apertures, said discs being formed to define an inner cavity concentric with said aligned apertures and resonant in a fundamental mode at the frequency of operation of the apparatus, conducting structure defining an outer annular cavity resonator disposed concentrically with said aligned apertures, said discs further being formed to provide an annular coupling gap connecting said inner cavity and said outer resonator, said annular coupling gap being dimensioned to provide an impedance transformer between said inner cavity and said outer resonator.

7. Ultra high frequency apparatus comprising, a pair of closely spaced, parallel, generally circular conducting discs having aligned apertures therein at the centers thereof, means adjacent said conducting discs for directing a beam of electrons through said apertures, said discs being formed cooperatively to define an inner cavity concentrically surrounding the path of said electron beam and resonant in a fundamental mode at the frequency of operation, an outer cavity resonator concentric with the path of said electron beam, said discs further being formed to define an annular coupling gap extending radially outward from said inner cavity into said outer resonator for coupling energy thereto from said inner cavity, and means coupled to said outer cavity resonator for extracting energy from said outer resonator at the frequency determined by said inner cavity.

8. An ultra high frequency oscillator comprising, a pair of spaced, circular conducting discs having aligned apertures therein, means adjacent said conducting discs for directing a beam of electrons through said apertures, said discs being formed to define a first small cavity resonator immediately adjacent the path of said electron beam, one of said discs being flexible to permit variation in size and accordingly the resonant frequency of said first resonator, conducting structure defining a second cavity resonator of annular volume concentrically surrounding said first resonator, said discs further being formed to define an annular coupling gap extending radially outward from said first resonator and extending into said second resonator for coupling energy from said first resonator to said second resonator, said coupling gap being dimensioned to provide an impedance transformation between said first and second resonators, and a wave guide coupled to said second resonator for extracting energy therefrom at the resonant frequency of said first resonator.

9. An ultra high frequency device comprising, in combination, a pair of spaced conducting discs having aligned apertures therein, means adjacent said conducting discs for directing a beam of electrons through said apertures, said discs being formed in the vicinity of said electron beam to define a flat cylindrical cavity resonant in a fundamental mode at the frequency of operation of the device, means defining an annular cavity resonator disposed concentrically with said apertures, said annular cavity resonator being larger in volume than said circular cavity and adapted to sustain oscillations at the operating frequency, said discs further being formed to provide an annular gap coupling said circular cavity to said annular cavity resonator, said annular gap being dimensioned to provide an impedance transformer between said circular cavity and said annular cavity, and a wave guide coupled to said annular resonator for extracting energy therefrom at the frequency determined by said circular cavity.

10. An oscillator comprising, two metal discs having aligned apertures therein at their centers and formed to define a first cavity resonator, means adjacent said first cavity resonator for directing a beam of electrons axially through said first cavity resonator, a reflector mounted transversely of the path of said electron beam for returning electrons into said first cavity resonator, a second cavity resonator of annular shape concentrically surrounding said first cavity resonator and supporting said two discs, said second cavity resonator being formed of a metal which can be sealed to glass, said discs further being formed to define an annular coupling gap communicating with said first cavity resonator and extending radially outward into said second cavity resonator, and a wave guide coupled to said second cavity resonator for extracting energy therefrom at the resonant frequency of said first resonator, the second cavity resonator providing an impedance transformation between said wave guide and said first cavity resonator.

References Cited in the file of this patent

UNITED STATES PATENTS

| | | |
|---|---|---|
| Re. 22,580 | Mouromtseff et al. | Dec. 19, 1944 |
| 2,250,511 | Varian et al. | July 29, 1941 |
| 2,259,690 | Hansen et al. | Oct. 21, 1941 |
| 2,287,845 | Varian et al. | June 30, 1942 |
| 2,293,151 | Linder | Aug. 18, 1942 |
| 2,410,822 | Kenyon | Nov. 12, 1946 |
| 2,413,251 | Smith | Dec. 24, 1946 |
| 2,416,302 | Goodall | Feb. 25, 1947 |
| 2,417,551 | Hill | Mar. 18, 1947 |
| 2,425,748 | Llewellyn | Aug. 19, 1947 |
| 2,452,062 | Le Van | Oct. 26, 1948 |
| 2,517,731 | Sproull | Aug. 8, 1950 |